United States Patent Office.

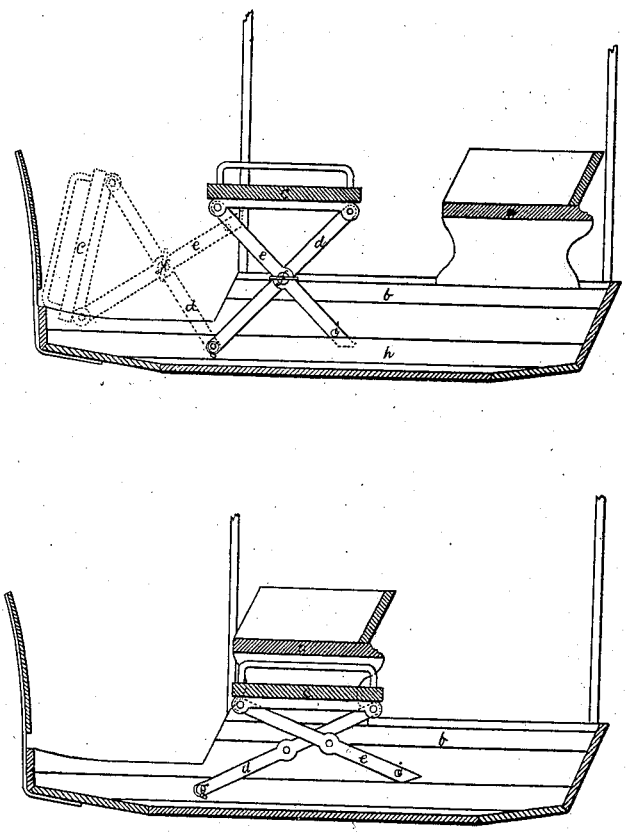

H. H. FORBES AND H. C. SEARS, OF NEW BEDFORD, MASSACHUSETTS.

Letters Patent No. 77,023, dated April 21, 1868.

IMPROVEMENT IN CARRIAGE-SEAT.

*The Schedule referred to in these Letters Patent and making part of the same.*

TO ALL WHOM IT MAY CONCERN:

Be it known that we, H. H. FORBES and H. C. SEARS, both of New Bedford, in the county of Bristol, and State of Massachusetts, have invented an Improvement in Carriage-Seats; and we do hereby declare that the following, taken in connection with the drawings which accompany and form part of this specification, is a description of our invention sufficient to enable those skilled in the art to practise it.

This invention is applicable where it is desirable, at times, to make use, in vehicles, of two seats, and at other times of but one seat, located nearly centrally with respect to the body of the vehicle, with the other seat stowed beneath the centrally-located seat, so as to be hidden from view, and so as to leave the front and rear of the vehicle-body clear from encumbrance.

Seats are now commonly arranged in vehicles so that one or two can be used, and so that when but one is in use the other is stowed beneath that one, but in said arrangement the front seat depends upon and is supported in position for use by leaning against the posts of the vehicle, which racks and strains them badly, often occasioning breakage.

The arrangement just referred to is not applicable to open wagons or vehicles without tops supported by posts, while our invention may be used in open vehicles, as well as with vehicles which have tops upheld by posts.

Our invention consists in mounting the front seat of a vehicle, at each end, on a pair of crossed legs, which are pivoted at their upper ends to the seat, the legs of each pair being clamped together at their crossing in such a way that by unclamping the legs they can move or fold with relation to the seat, allowing it to fall or drop, so that the back seat can be slid forward over the front seat when so dropped, the front seat, in falling, pivoting on one leg of each pair, while the other leg of each pair folds or moves, so as to admit of the depression of the front seat.

The drawing, which illustrates an embodiment of our invention, shows, in

Figure 1, a sectional elevation of the body of a vehicle with two seats located as when in use, and in said figure the front seat is shown in red lines as tipped forward to facilitate access to the rear seat.

Figure 2 is a view similar to fig. 1, but showing the front seat with its crossed legs unclamped and dropped downward and rearward, so that the rear seat can be drawn forward over the front seat, as shown.

The rear seat is marked $a$, and is arranged to slide on ways, $b$, forming part of the carriage-body. The front seat is marked $c$, and is mounted at each end on a pair of crossed legs, the legs being denoted by $d$ and $e$. Each of said legs is pivoted to the seat $c$, and they so arranged as to cross each other, and to be clamped together at their crossing.

For clamps, we make use of a screw, $f$, with each pair of legs, each screw passing through one leg of each pair, and fitting in nut-threads formed in the other leg of its pair. Other devices may be substituted for the screws $f$ to clamp the legs together, but the device shown is simple and effective.

While the legs are clamped together, as seen in fig. 1, they are rigidly fixed with respect to each other and to the seat, to which they afford a firm base and support, on which the seat $c$ stands, without leaning against posts. The legs $d$ we prefer to pivot to the carriage-body, as seen at $g$, so that the seat can swing forward on the pivots at $g$, as on centres, as seen in fig. 1, or backward, as seen in fig. 2. The legs $e$ of each crossed pair are at their lower end let into a mortise in the body-frame $h$, so as to steady the seat in its upright position, and to keep the weight which may rest on seat $c$ from spreading or bending the legs below the clamps.

We prefer to unite the legs $e$ by a cross-rod, $i$, so that when the clamp-screws $f$ are removed, both legs, $e$, can be lifted from either side of the vehicle out of the mortises in which they rest, so as to let the seat fall downward and rearward.

We claim, in combination with the seat of a carriage, the pivoted, crossed, and clamped legs, arranged to operate substantially as and for the purpose described.

H. H. FORBES,
H. C. SEARS.

Witnesses:
SYLVESTER R. COVEY,
FREDC. B. ALLEN.